(12) United States Patent
Poll

(10) Patent No.: US 7,134,696 B2
(45) Date of Patent: Nov. 14, 2006

(54) COMPRESSION CAP

(75) Inventor: Steven Allen Poll, Zeeland, MI (US)

(73) Assignee: Trans-Matic Mfg. Co., Incorporated, Holland, MI (US)

( * ) Notice: Subject to any disclaimer, the term of this patent is extended or adjusted under 35 U.S.C. 154(b) by 0 days.

(21) Appl. No.: 10/763,711

(22) Filed: Jan. 23, 2004

(65) Prior Publication Data

US 2005/0161939 A1 Jul. 28, 2005

(51) Int. Cl.
*F16L 33/00* (2006.01)

(52) U.S. Cl. .................. 285/256; 285/259; 285/23; 29/237

(58) Field of Classification Search ........... 285/256, 285/259, 257, 23; 29/890.14, 282, 237
See application file for complete search history.

(56) References Cited

U.S. PATENT DOCUMENTS

| | | | | |
|---|---|---|---|---|
| 398,582 A * | 2/1889 | Cowen | .................. | 285/256 |
| 1,006,671 A * | 10/1911 | Myer | .................. | 285/247 |
| 2,091,852 A * | 8/1937 | Hinds | .................. | 285/149.1 |
| 2,147,356 A * | 2/1939 | Scholtes | .................. | 285/256 |
| 2,367,447 A * | 1/1945 | Strout | .................. | 285/247 |
| 2,374,225 A * | 4/1945 | Walter | .................. | 285/222.4 |
| 2,453,997 A * | 11/1948 | MacWilliam | .................. | 285/256 |
| 2,481,001 A * | 9/1949 | Burckle | .................. | 285/222.4 |
| 2,810,594 A * | 10/1957 | Walsh et al. | .................. | 285/258 |
| 2,978,263 A * | 4/1961 | Walsh et al. | .................. | 285/256 |
| 3,030,129 A * | 4/1962 | Appleton | .................. | 285/257 |
| 3,160,428 A * | 12/1964 | Goodall | .................. | 285/256 |
| 4,305,608 A * | 12/1981 | Stuemky et al. | .................. | 285/256 |
| 4,408,786 A * | 10/1983 | Stuemky | .................. | 285/256 |
| 5,195,788 A * | 3/1993 | Oetiker | .................. | 285/252 |
| 5,722,150 A * | 3/1998 | Swanson, III | .................. | 29/508 |
| 5,797,629 A * | 8/1998 | Beagle | .................. | 285/256 |
| 6,296,283 B1 * | 10/2001 | Dietzel | .................. | 285/256 |
| 6,439,617 B1 * | 8/2002 | Boer et al. | .................. | 285/256 |
| 6,523,862 B1 * | 2/2003 | MacDuff | .................. | 285/256 |

OTHER PUBLICATIONS

"Pexcel Pureflow Water Systems", product brochure, Jan. 9, 2004, Stadler Viega, Bedford, Massachusetts.

* cited by examiner

*Primary Examiner*—David Bochna
(74) *Attorney, Agent, or Firm*—Warner Norcross & Judd LLP

(57) ABSTRACT

A one-piece unitary compression cap for securing a pipe or tube on a fitting. The cap includes at least one inward deformation that provides an interference fit between the cap and the pipe or tube. Consequently, the cap cannot fall off the pipe or tube before being permanently crimped.

8 Claims, 6 Drawing Sheets

COMPRESSION CAP

BACKGROUND OF THE INVENTION

The present invention is related to compression caps, and more particularly to compression caps used in plumbing connections.

Compression caps are well known for connecting a section of pipe or tubing to a fitting. The current method is a metal band that is positioned and crimped onto the end of a pipe or tube to secure the tube to a fitting. The cap is crimped using a specially designed tool. These caps may be used in a wide variety of plumbing applications including recreational vehicles, modular homes, marine crafts and beverage dispensing machines.

The proper positioning of the compression caps on the pipe ends is important. Accordingly, the present caps are designed to enhance the likelihood that the cap will be properly positioned. One such cap is sold by Stadler-Viega of Bedford, Mass. under the Pureflow trademark. As illustrated in FIGS. 1 and 2, this cap 100 includes a shoulder 110 at one end 120 to provide a positive stop for the pipe 130 within the cap. The cap also defines a "witness window" 115 to permit visual observation and confirmation that the pipe is properly positioned within the cap end against the flange 110. The flange 110 assists in properly positioning the cap on the tube end.

Unfortunately, there are difficulties in the installation of conventional compression caps. After a cap is placed on the end of the pipe, it must be physically held in place until the fitting is inserted into the pipe and the cap is compressed, which requires two hands. If this is not done, the cap may fall off the tube. This problem is exacerbated when the installation of a cap is attempted in a tight space, because the user may only be able to reach the pipe and the cap with one hand.

SUMMARY OF THE INVENTION

The aforementioned problems are overcome by the present invention wherein a compression cap is provided with an inward deformation that provides a friction fit or an interference fit between the cap and the outer surface of the pipe.

In the disclosed embodiment, the inward deformation is a plurality of longitudinal ribs evenly spaced about the circumference of the cap. As the cap is placed on the pipe, the ribs engage the outer surface of the pipe creating friction and thereby preventing the cap from falling off the pipe prematurely.

The present invention provides a number of advantages over conventional compression caps. First, users of the present invention are no longer required to hold the cap in position on the pipe, or to keep the pipe in an upright position prior to placing the pipe onto the fitting. Second, the inward deformation aids in preventing the cap from slipping, moving, or being pushed out of position before the crimp is performed. Third, the number of caps lost inside walls or compartments where pipes are located will be reduced, because caps will be less likely to fall off the pipe after they are placed there. Fourth, installation of caps in tight spaces is much easier with the present invention, because the same hand can be used to place the cap on the pipe, then insert the fitting, and then crimp the cap. Fifth, the inward deformation contributes to a stronger connection between the pipe and the fitting or other object inside the pipe.

These and other objects, advantages, and features of the invention will be readily understood and appreciated by reference to the detailed description of the preferred embodiment and the drawings.

DETAILED DESCRIPTION OF THE PREFERRED EMBODIMENT

Figure 1:
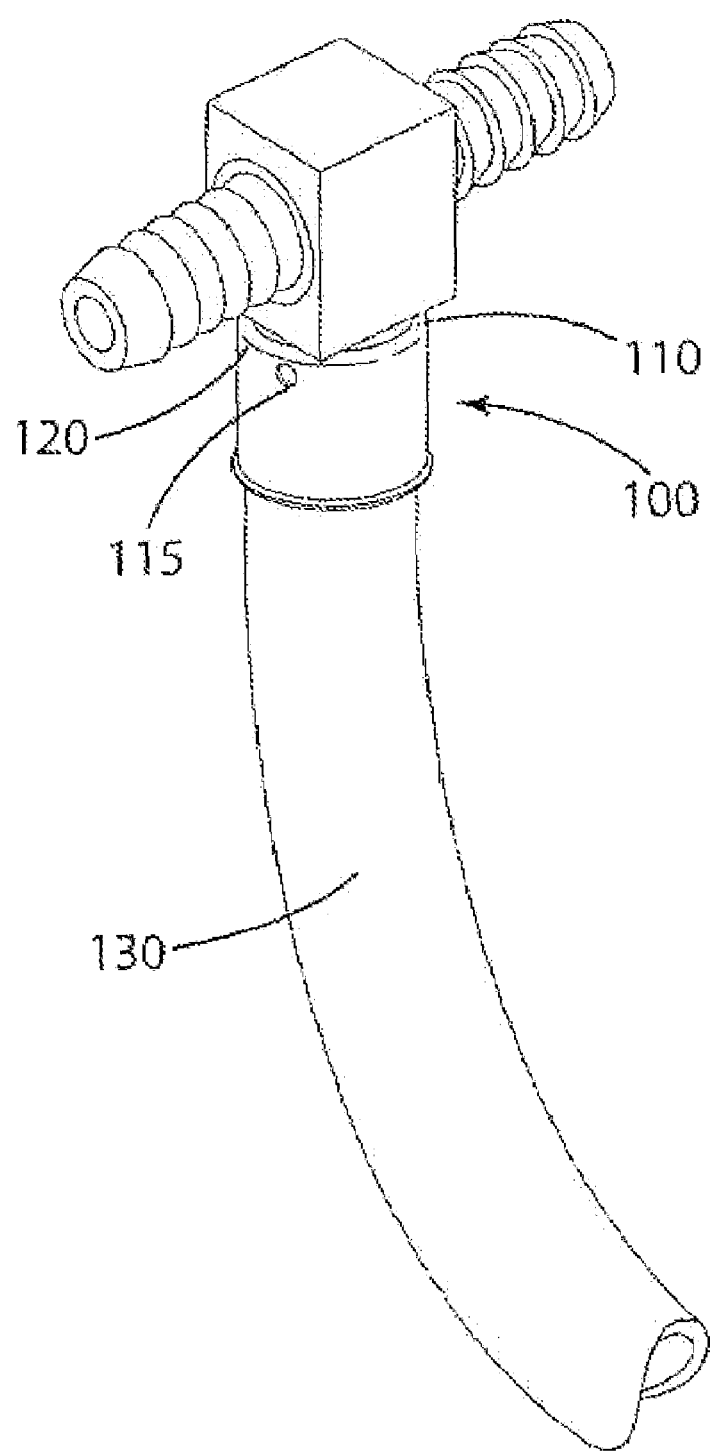
FIG. 1 is a perspective view of a prior art cap in combination with a pipe and a fitting.
Figure 2:
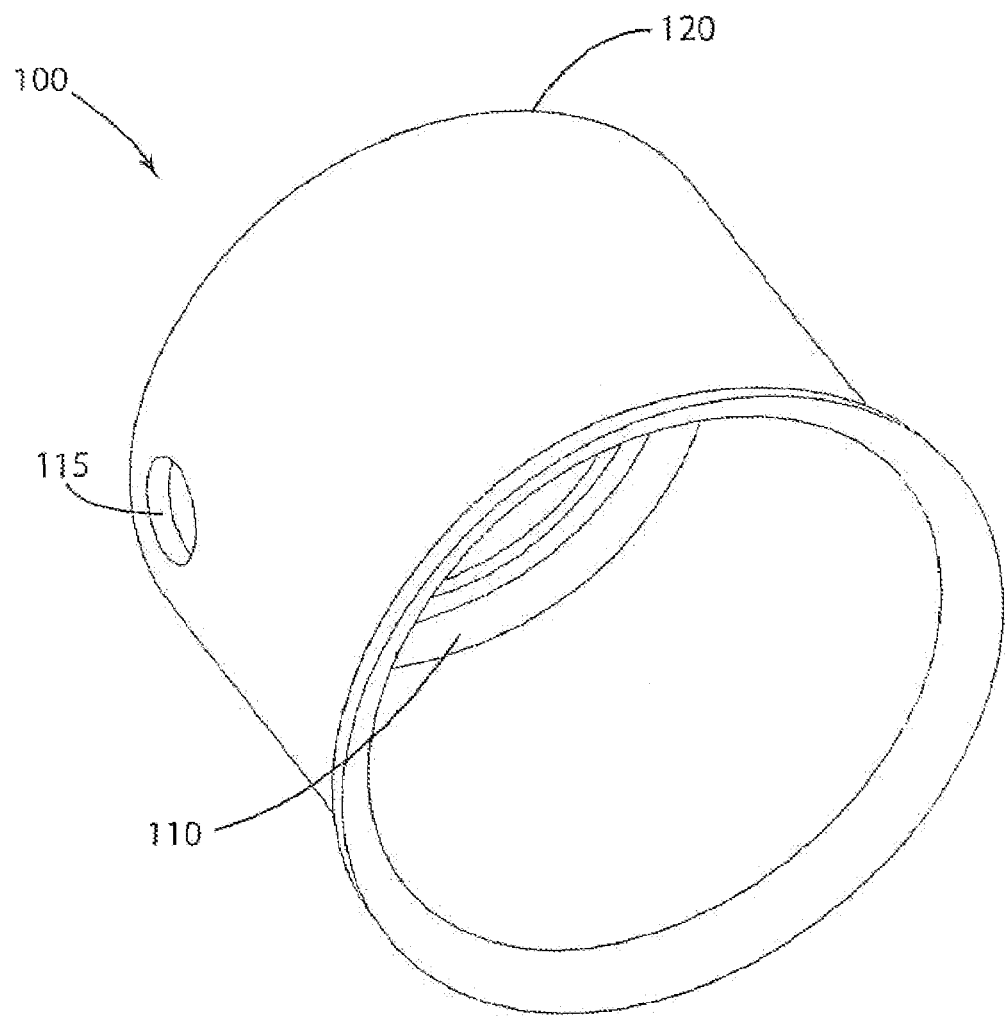
FIG. 2 is a perspective view of the prior art cap.
Figure 3:
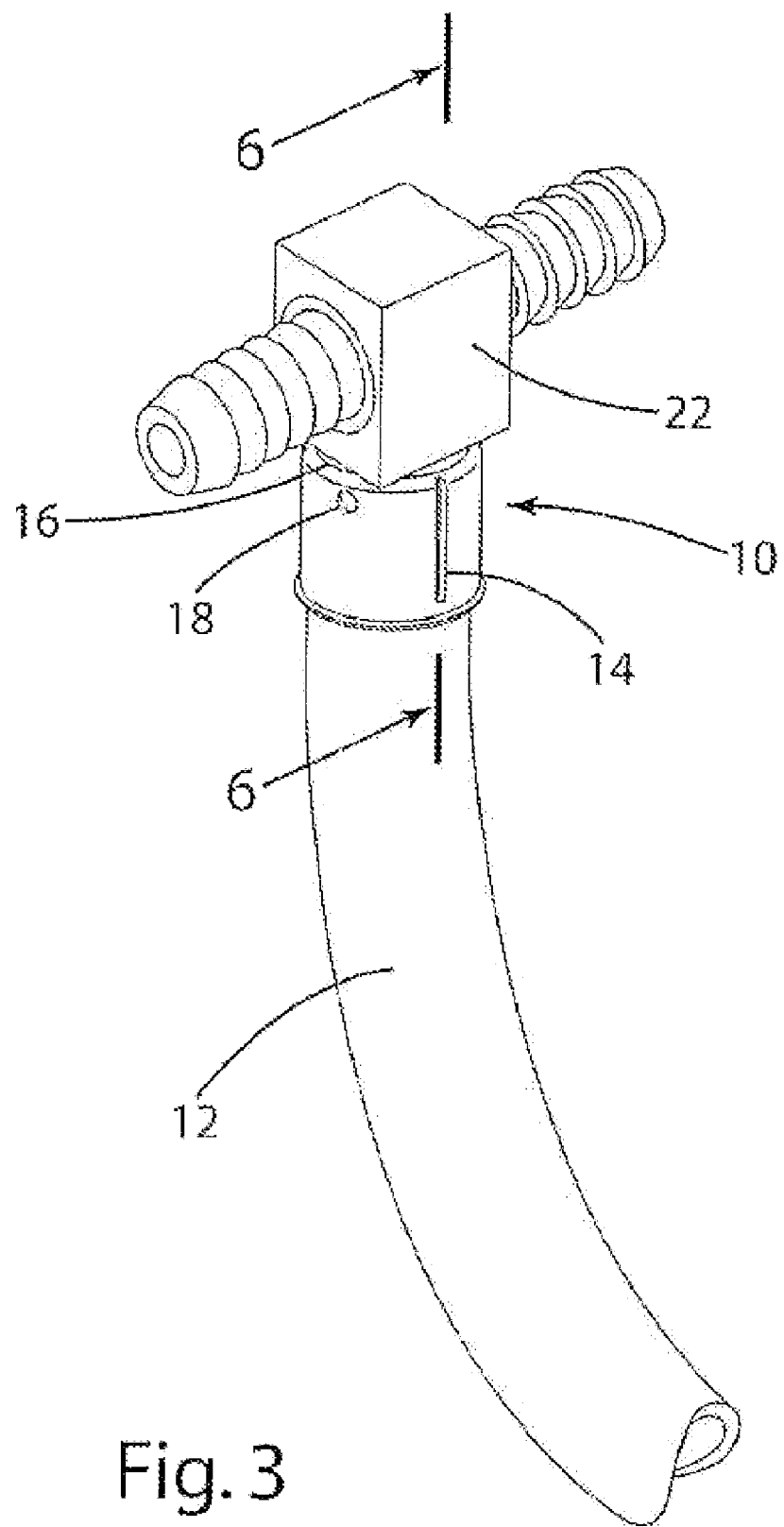
FIG. 3 is a perspective view of the cap of the present invention in combination with a pipe and a fitting.

A compression cap in accordance with the preferred embodiment is shown in FIG. 3 and generally designated 10. The cap 10 is preferably a metal band that is capable of slidably fitting over a pipe or tube 12. The cap 10 preferably includes a plurality of spaced apart ribs 14, a positive stop flange 16, and a witness window 18. In operation, the cap 10 is placed over the end of a pipe 12, and a fitting 22 is inserted into the cap 10 at the same end of the pipe 12. The cap 10 is then crimped with a crimping tool (not shown) to compress the cap 10 about the pipe 12 and the fitting 22, securing the fitting 22 inside the pipe 12.

I. Structure

Figure 6:
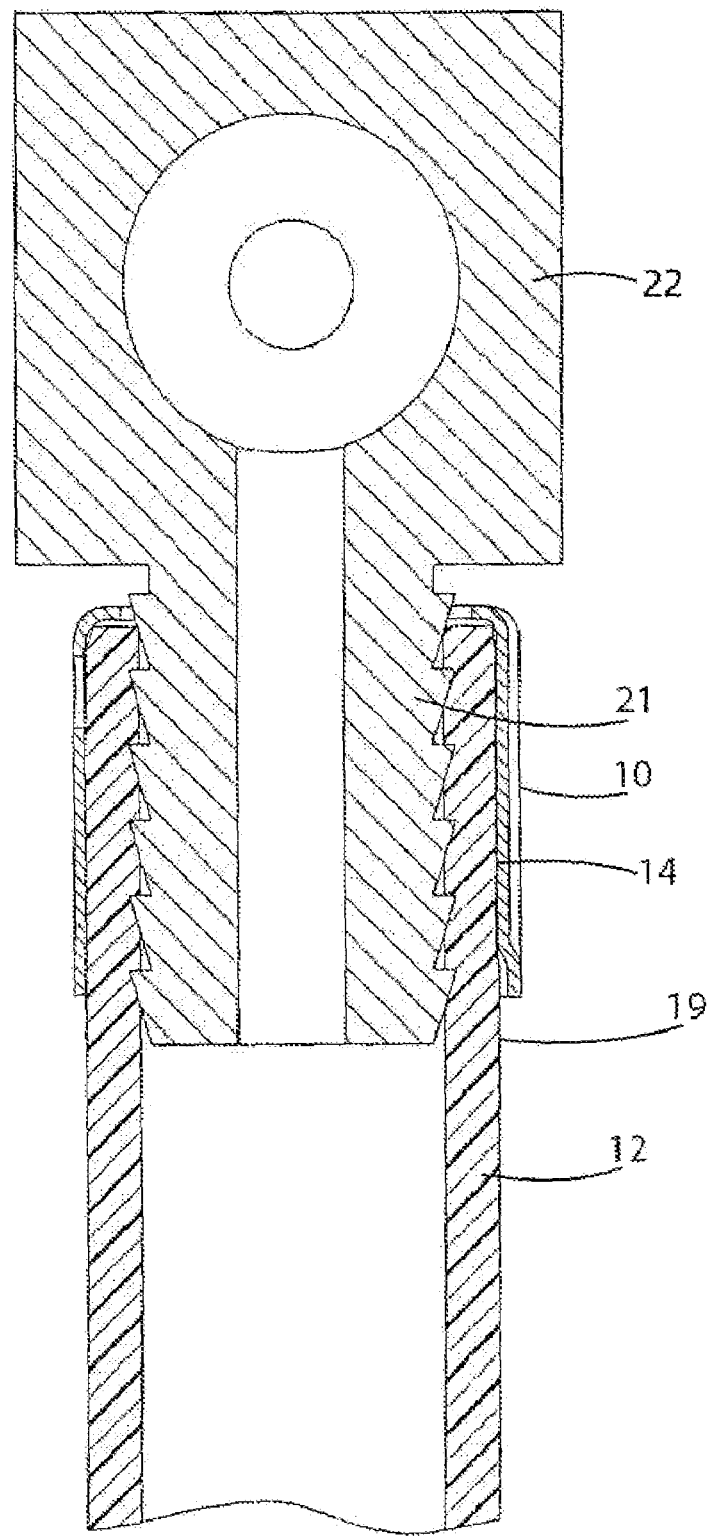
FIG. 6 is a sectional view taken along line 6—6 in FIG. 3.
Figure 7:
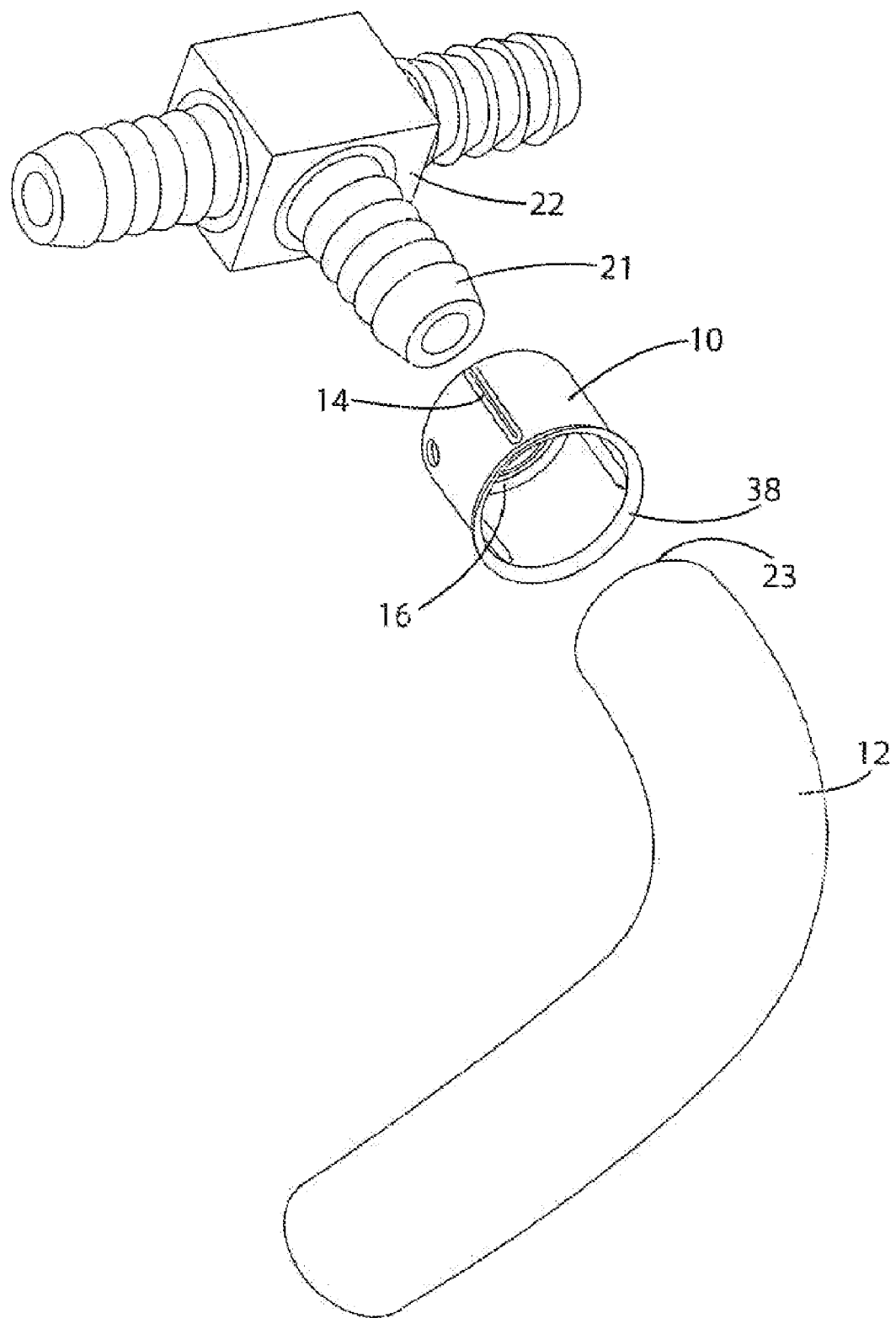
FIG. 7 is a perspective exploded view of FIG. 3.

Shown in FIGS. 6 and 7, the pipe 12 is well known and generally comprised of, but not limited to, plastic, such as PVC or PEX (cross linked polyethylene). The pipe includes an outer surface 19, and an end 23 that will receive the cap 10. Depending on the desired application, the pipe may be a rigid or flexible, and may have a variety of standard sizes. The fitting 22 is also well known and is available in standard sizes. They are generally comprised of a metal, such as brass, or plastic, and include at least one insert 21 having a diameter slightly smaller than the inner diameter of the pipe 12 such that it can be inserted into the end 23 of the pipe 12. The T-shaped fitting 22 shown is intended to be exemplary of just one type of such pipe fittings.

Figure 4:
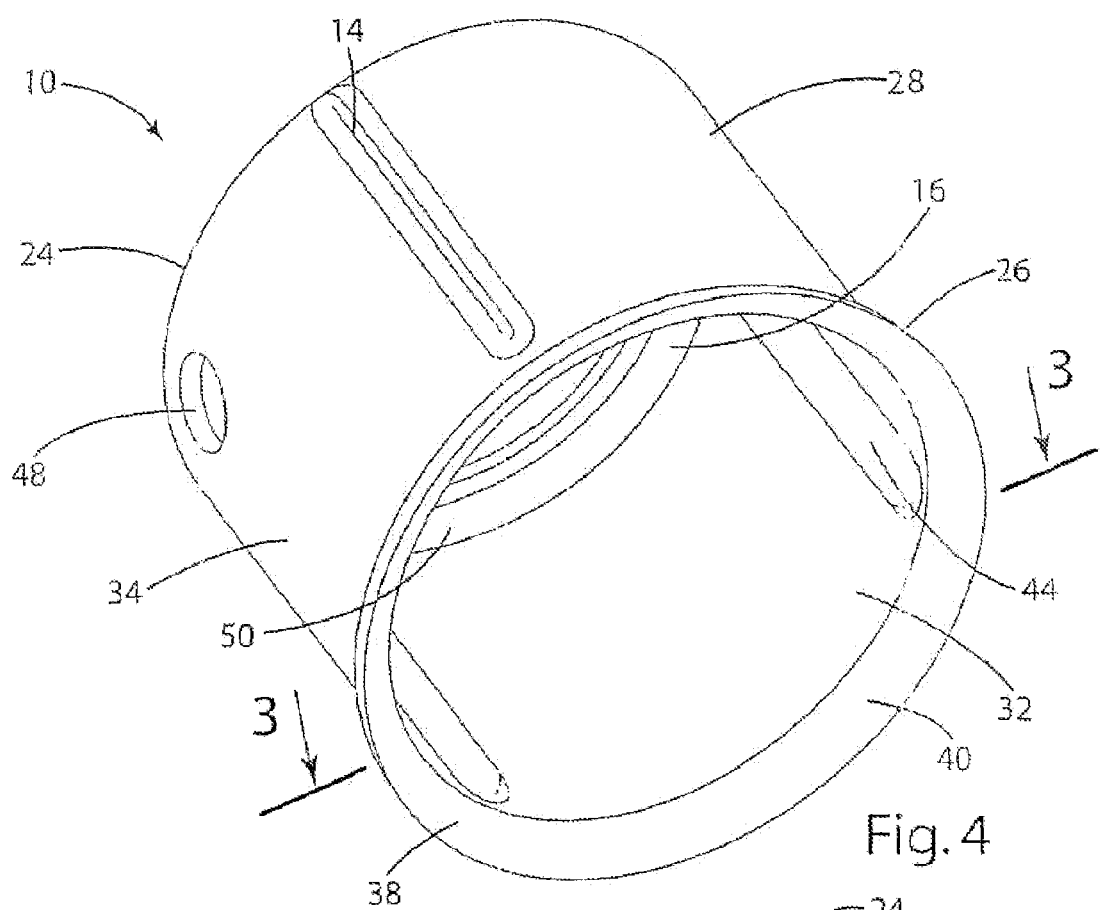
FIG. 4 is a perspective view of the cap.

As shown in FIG. 4, the cap 10 is generally a metal band having a circumference of any desired size so that it fits over a desired pipe or tube. The metal band 10 includes a first end 24, a second end 26, and a side wall 28 extending between the first end 24 and second end 26. The side wall 28 has a generally uniform thickness between the first end 24 and the second end 26. The width of the side wall between the first and second ends 24 and 26 may vary with the desired application. The side wall 28 also includes an inner surface 32, an outer surface 34. In the preferred embodiment, a lip 38 extends radially outward from the second end 26. The lip 38 includes a radius 40 that forms a smooth transition with the side wall 28.

Figure 5:
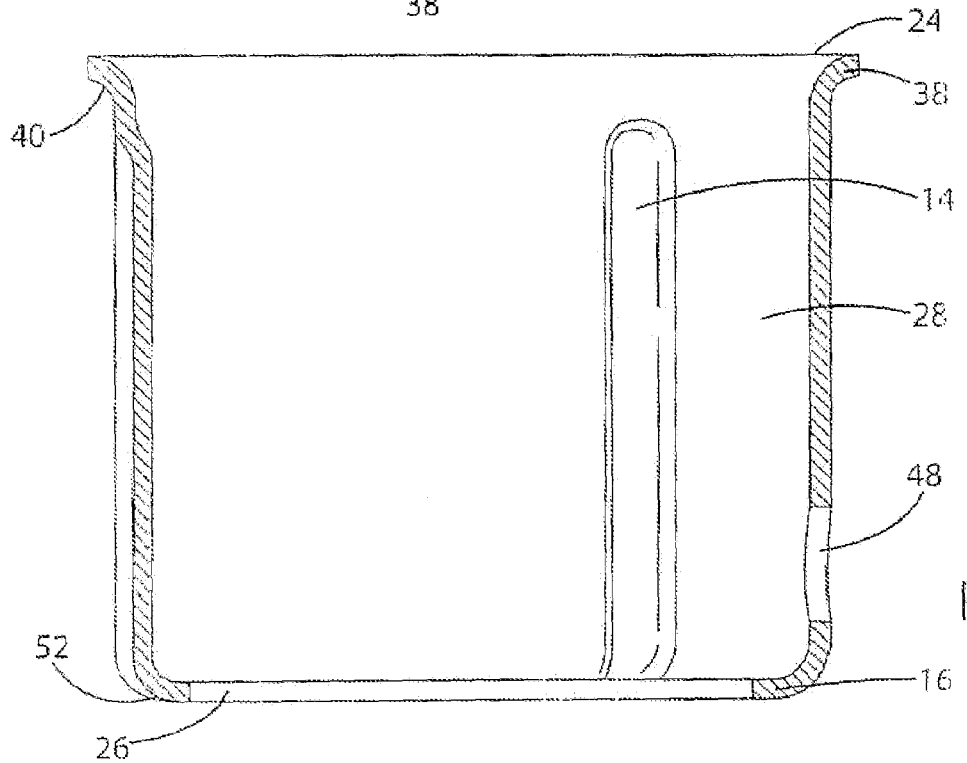
FIG. 5 is a sectional view taken along line 3—3 in FIG. 4.

The side wall 28 also includes a plurality of inward deformations. As shown in FIGS. 4 and 5, in the preferred embodiment, the inward deformations are a plurality of ribs 14. The ribs 14 preferably extend across the substantial width of the side wall 28, forming an indentation 42 in the outer surface 34 and a corresponding protrusion 44 on the inner surface 32. The depth of the protrusion 44 may vary depending on the desired interference between the ribs 14 and the pipe 12. In a preferred embodiment, three ribs 14 are spaced evenly about the sidewall 28. However, any number of ribs 14 may be used, and the ribs 14 may have a different orientation, such as running circumferentially about the cap 10. Alternatively, the inward deformations may be a number of dimples, or a differently shaped inward deformation that creates a friction fit between the cap 10 and the pipe 12.

In the preferred embodiment, a positive stop flange 16 extends radially inward from the first end 24 of the cap 10. The flange 16 preferably extends around the entire circumference of the cap 10, having an inner surface 50, and an outer surface 52. The depth of the flange 16 is approximately the same, but not greater than, the thickness of the pipe 12, so that the fitting 22 may still be inserted through the cap 10 and into the end of the pipe 12. In another embodiment, the side wall 28 includes a hole 48, or witness window. The hole 48 is proximate to the first end 24 of the cap 10, allowing a user to view the pipe 12 through the window 48 when the cap 10 is placed on the pipe 12.

II. Operation

In operation, the second end 26 of the cap 10 is positioned proximate to the end 23 of the pipe 12. A user will then slide the cap 10 onto the end 23 of the pipe 12. As the cap 10 slides onto the pipe 12, the lip 38 on the second end 26 of the cap 10 serves to guide the pipe 12 into the cap 10, and then the ribs 14 engage the outer surface 19 of the pipe 12, creating a friction fit between the ribs 14 and the pipe 12 for crimping. The pipe 12 is slid onto the cap 10 until the end 23 of the pipe 12 contacts the inner surface 50 of the flange 16, and the pipe 12 is visible through the window 48. The flange 16 prevents the cap 10 from sliding farther onto the pipe 12, and the friction fit created by the ribs 14 prevents the cap from sliding off the pipe 12 without a force being applied by the user. Once the cap 10 is in place, the insert 21 of the fitting 22 is inserted into the end 23 of the pipe 12, and the cap 10 is crimped with a crimping tool to compress the cap 10 onto the pipe 12, and compress the pipe 12 onto the fitting 22.

The above description is that of a preferred embodiment of the invention. Various alterations and changes can be made without departing from the spirit and broader aspects of the invention as defined in the appended claims, which are to be interpreted in accordance with the principles of patent law including the doctrine of equivalents. Any reference to claim elements in the singular, for example, using the articles "a," "an," "the" or "said," is not to be construed as limiting the element to the singular.

The invention claimed is:

1. A one-piece unitary compression cap for installation onto a cylindrical conduit having a conduit diameter comprising:
   a generally cylindrical wall having opposite longitudinal ends and a generally uniform thickness between said ends, said cylindrical wall having a wall diameter enabling said wall to slide onto the conduit;
   a shoulder extending radially inwardly from one of said ends and forming a stop against the conduit; and
   at least one inward deformation projecting radially inwardly from said cylindrical wall, wherein said inward deformation comprises at least one longitudinal rib, said deformation providing a friction fit between said cap and said conduit as said cap is slid onto the conduit.

2. A plumbing connection comprising:
   a fitting;
   a generally cylindrical conduit having an outer surface with a conduit diameter and an end fitted onto said fitting; and
   a one-piece unitary compression cap on said end of said conduit and adapted to be compressed about said conduit to secure said conduit on said fitting, said cap including first and second ends, a shoulder extending radially inwardly from said first end and engaging said conduit, a cylindrical sidewall having a generally uniform thickness between said ends, and an inward deformation projecting radially inwardly from said sidewall, said cylindrical sidewall having a wall diameter enabling said sidewall to slide on said conduit end, said deformation engaging said conduit and providing a friction fit between said cap and said conduit as said cap is slid onto said conduit end.

3. The cap of claim 2 wherein said cap includes a plurality of said inward deformations spaced about the circumference of said cap.

4. A plumbing connection comprising:
   a fitting;
   a generally cylindrical conduit having an outer surface with a conduit diameter and an end fitted onto said fitting; and
   a one-piece unitary compression cap on said end of said conduit and adapted to be compressed about said conduit to secure said conduit on said fitting, said cap including first and second ends, a cylindrical sidewall having a generally uniform thickness between said ends, and an inward deformation projecting radially inwardly from said sidewall, said cylindrical sidewall having a wall diameter enabling said sidewall to slide on said conduit end, said deformation engaging said conduit and providing a friction fit between said cap and said conduit as said cap is slid onto said conduit end, wherein said cap includes a plurality of said inward deformations spaced about the circumference of said cap, and wherein at least one of said deformations are longitudinal ribs.

5. The cap of claim 4 wherein said cap defines a window proximate said first end, whereby said conduit is visible through said window.

6. The cap of claim 4 wherein said shoulder extends around the entire circumference of said first end of said cap.

7. The cap of claim 4 further comprising a lip extending radially outwardly from said second end of said cap.

8. A method of mounting a cylindrical conduit having a conduit diameter on a fitting comprising the steps of:
   sliding a one-piece unitary compression cap on an end of the conduit, the cap including first and second ends, a cylindrical sidewall having a generally uniform thickness between said first and second ends, and at least one deformation extending radially inwardly from said cylindrical sidewall, said deformation dimensioned to provide an interference fit between the cap and the conduit as the cap is slid onto the conduit;
   after said sliding step, positioning the conduit end on the fitting; and
   after said positioning step, compressing the cap to compress and secure the conduit on the fitting.

\* \* \* \* \*